Dec. 7, 1926.
W. C. BROADWELL
COMBINED CONFECTION AND WHISTLE
Filed April 2, 1924
1,609,791
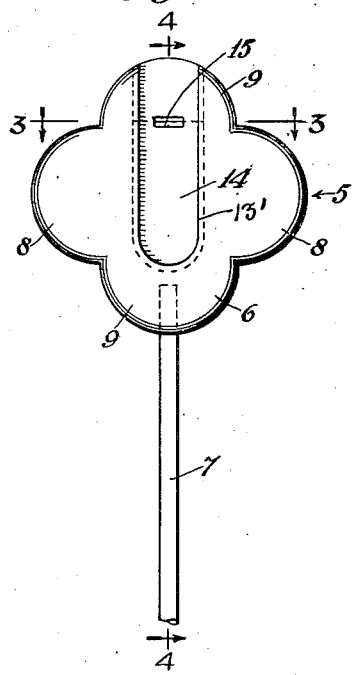
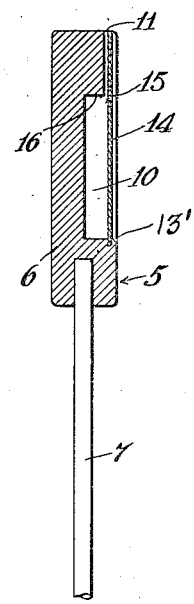
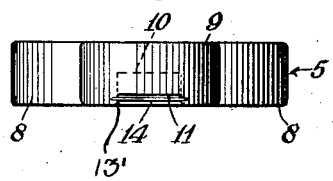
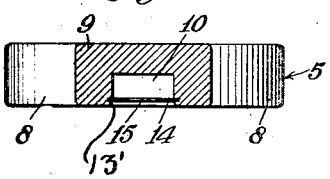
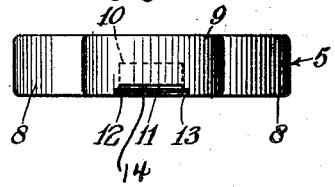
INVENTOR
William C. Broadwell
BY
Williams & Pritchard
ATTORNEYS Patented Dec. 7, 1926.

1,609,791

UNITED STATES PATENT OFFICE.

WILLIAM C. BROADWELL, OF BROOKLYN, NEW YORK.

COMBINED CONFECTION AND WHISTLE.

Application filed April 2, 1924. Serial No. 703,584.

This invention relates to confections and has particular reference to a combined confection and whistle, the confection being herein shown as a candy article commonly known as a lollypop.

An important object of the invention is to provide a combined confection and whistle which is attractive in appearance, inexpensive to manufacture, and which will readily lend itself to quantity production.

Other objects and certain advantages of the invention will become apparent from the following description when taken in connection with the accompanying drawings in which—

Figure 1 is a plan view of the article embodying my invention.

Figure 2 is an end view of the article as viewed from the top in Figure 1.

Figure 3 is a transverse sectional view taken on line 3—3 of Figure 1.

Figure 4 is a longitudinal sectional view taken on line 4—4 of Figure 1.

Figure 5 is a view similar to that of Figure 3 showing the strip of paper placed in position prior to upsetting the adjacent margins of the candy body.

In the drawings wherein for the purpose of illustration is shown what I at present consider the preferred form of my invention, the numeral 5 indicates, as a whole, a lollypop, comprising a main body or candy portion 6, within which is embedded one end of a stick 7 which serves as a means by which the article may be held. The main body is so shaped or formed as to present a plurality of oppositely disposed outwardly extending side and end lobes 8 and 9, respectively. During the process of so forming the candy portion as to present the contour shown most clearly in Figure 1 the same is acted upon to provide a depression or pocket 10 and a channel 11. It will be noted that the pocket or depression 10 is somewhat deeper than the channel 11 and that both the depression and the channel are so formed as to present a boundry ledge 12, the plane of which lies an appreciable distance below the face of the body portion thus forming a recess 13. The ledge 12 receives thereupon a strip 14 of paper or similar material which is provided with an opening 15 and is adapted to snugly fit into the recess 13 bounding the depression or pocket 10 and the channel 11. This strip is adapted to be retained in proper position upon the ledge 12 by upsetting the candy adjacent the pocket 10 and recess 13 to form a bead 13' and thereafter forcing the same into intimate engagement with the outer margins of the strip 14, as shown in Figure 3. In this connection it will be readily appreciated that the upsetting may be easily accomplished while the candy portion of the article is in a more or less plastic condition incident to the moulding thereof and that after the candy is allowed to harden an effective means is afforded for permanently retaining the strip 14 so positioned upon the ledge 12 that the opening 15 is maintained in the vicinity of the jointure of the pocket 10 with the channel 11 or directly above the abutment 16 which is formed due to the difference in depth between the pocket 10 and channel 11.

Having thus described certain embodiments of my invention what I claim is:

1. A candy article comprising a body portion having a pocket formed therein, a perforated closure positioned over said pocket and having its margin overlying that area of said body portion which is adjacent said pocket, and a bead formed integral with said body portion and overlying said margin of said closure, said bead being in intimate surface contact with said closure and cooperating therewith to form a seal for said pocket in the vicinity of said overlying margin of said closure, said closure cooperating with said pocket and said body portion to form a whistle.

2. A candy article comprising a body portion having a pocket formed therein and provided with a ledge lying below the surface of said body portion and bounding said pocket, a perforated closure positioned over said pocket and having its margin resting upon said ledge, and a bead formed integral with said body portion and overlying said margin of said closure, said bead being in intimate surface contact with said closure and cooperating therewith to form a seal for said pocket in the vicinity of said ledge, said closure co-operating with said pocket and said body portion to form a whistle.

3. A candy article comprising a body portion having a pocket formed therein and provided with a channel at one end of said pocket, said body portion being provided with a ledge lying below the surface thereof and bounding said pocket and said channel, a perforated closure positioned over said pocket and said channel and having its margin resting upon said ledge, a bead formed integral with said body portion and overlying said margin of said closure, said bead being in intimate surface contact with said closure and cooperating therewith to form a seal for said pocket and said channel in the vicinity of said overlying margin of said closure, said closure cooperating with said pocket and said channel and said body portion to form a whistle.

In testimony whereof, I have affixed my signature to this specification.

WILLIAM C. BROADWELL.